(12) United States Patent  
Komada (10) Patent No.: US 9,113,088 B2  
(45) Date of Patent: Aug. 18, 2015

(54) METHOD AND APPARATUS FOR PHOTOGRAPHING AN IMAGE USING LIGHT FROM MULTIPLE LIGHT SOURCES

(71) Applicant: SAMSUNG ELECTRONICS CO., LTD., Suwon-si, Gyeonggi-do (KR)

(72) Inventor: Jun Komada, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/098,764

(22) Filed: Dec. 6, 2013

(65) Prior Publication Data

US 2014/0160317 A1  Jun. 12, 2014

(30) Foreign Application Priority Data

Dec. 6, 2012  (JP) ................................. 2012-267057  
Nov. 29, 2013  (KR) ......................... 10-2013-0147318

(51) Int. Cl.
| | |
|---|---|
| H04N 5/235 | (2006.01) |
| G03B 15/03 | (2006.01) |
| H04N 5/77 | (2006.01) |
| H04N 5/225 | (2006.01) |

(52) U.S. Cl.
CPC .............. *H04N 5/2354* (2013.01); *G03B 15/03* (2013.01); *H04N 5/2256* (2013.01); *H04N 5/772* (2013.01)

(58) Field of Classification Search
CPC . H04N 5/2351; H04N 5/2354; H04N 5/2352; H04N 5/772; G03B 15/03

USPC .......... 348/218.1, 221.1, 224.1, 207.99, 274, 348/370

See application file for complete search history.

(56) References Cited

U.S. PATENT DOCUMENTS

| | | | |
|---|---|---|---|
| 6,542,180 B1 * | 4/2003 | Wasserman et al. .......... 348/131 |
| 2007/0211242 A1 * | 9/2007 | Okabe et al. ............... 356/237.2 |
| 2013/0016189 A1 * | 1/2013 | Hosaka .......................... 348/49 |

FOREIGN PATENT DOCUMENTS

| | | |
|---|---|---|
| JP | 11-196325 A | 7/1999 |
| JP | 2010-074725 A | 4/2010 |

* cited by examiner

*Primary Examiner* — Mekonnen Dagnew  
(74) *Attorney, Agent, or Firm* — Drinker Biddle & Reath LLP

(57) ABSTRACT

Provided is a photographing apparatus including: first and second light sources that respectively transmit a first light having a first spectral radiant characteristic and a second light having a second spectral radiant characteristic; an image device that captures an image of a subject by using the transmitted lights sources; a storage unit that stores a first reference output ratio corresponding to the first light and a second reference output ratio corresponding to the second light; and a determiner that determines a regular reflection area of the light sources by using a first captured image acquired by capturing an image of the subject by using the first light, a second captured image acquired by capturing an image of the subject by using the second light, the first reference output ratio, and the second reference output ratio.

11 Claims, 6 Drawing Sheets

FIG. 7D

METHOD AND APPARATUS FOR PHOTOGRAPHING AN IMAGE USING LIGHT FROM MULTIPLE LIGHT SOURCES

CROSS-REFERENCE TO RELATED APPLICATIONS

This application claims the priority benefit of Japanese Patent Application No. 2012-267057, filed on Dec. 6, 2012, in the Japanese Patent Office; and Korean Patent Application No. 10-2013-0147318, filed on Nov. 29, 2013, in the Korean Intellectual Property Office, the disclosures of which are incorporated herein in their entirety by reference.

BACKGROUND

1. Field

One or more embodiments relate to a method and apparatus for photographing an image using light from multiple light sources.

2. Description of the Related Art

When pictures are taken in darkness using a photographing apparatus, auxiliary lighting is typically used. However, regular reflection from the auxiliary lighting is frequently captured, thus generating an unnatural image.

SUMMARY

One or more embodiments described herein include a method of photographing images that involves using light from multiple light sources, each light having different spectral radiant characteristics, and determining regular reflection areas of the light from each source based on the captured images and on a pre-stored reference output ratio.

Additional aspects will be set forth in part in the description that follows and, in part, will be apparent from the description or may be learned by practicing the described embodiments.

According to one or more embodiments, a photographing apparatus includes: a first light source that transmits a light ("a first light") having a first spectral radiant characteristic; a second light source that transmits light ("a second light") having a second spectral radiant characteristic; an imaging device that captures an image of a subject by using the first light source and second light source; a storage unit that stores a first reference output ratio corresponding to the first light and a second reference output ratio corresponding to the second light. The photographing apparatus further includes a determiner that determines a regular reflection area of the first and second light sources by using a first captured image, which is acquired by capturing an image of the subject using the first light; a second captured image, which is acquired by capturing an image of the subject by using the second light; the first reference output ratio; and the second reference output ratio.

The first reference output ratio may be an output ratio between pixels output from the imaging device when capturing an image of the subject using the first light, and the second reference output ratio may be an output ratio between pixels output from the imaging device when capturing an image of the subject using the second light.

The determiner may extract a first regular reflection candidate area from the first captured image by using the first reference output ratio, extract a second regular reflection candidate area from the second captured image by using the second reference output ratio, and determine an area overlapping between the first and second regular reflection candidate areas to be the regular reflection area of the first and second light sources.

An incidence angle of the first light may be equal to an incidence angle of the second light.

The photographing apparatus may further include an interpolation processor that interpolates a pixel included in the regular reflection area.

The interpolation processor may interpolate the pixel included in the regular reflection area based on: a neighboring pixel of the regular reflection area, an image captured before an image including the regular reflection area, an image captured after an image including the regular reflection area, or a degree of an intensity modulation of the light sources.

If the regular reflection area is larger than or equal to a preset threshold value, the interpolation processor may output information usable for selecting an interpolation method for the pixel included in the regular reflection area.

If the regular reflection area is larger than or equal to the preset threshold value, the interpolation processor may output information for usable to notify a user of a capturing error.

At least one of the light sources may be removably installed in the photographing apparatus.

According to one or more embodiments, a method includes: capturing an image of a subject by using a first light having a first spectral radiant characteristic to acquire a first captured image; capturing an image of the subject by using a second light having a second spectral radiant characteristic to acquire a second captured image; extracting a first regular reflection candidate area from the first captured image by using a first reference output ratio corresponding to the first light; extracting a second regular reflection candidate area from the second captured image by using a second reference output ratio corresponding to the second light; and determining an area overlapping between the first and second regular reflection candidate areas to be a regular reflection area of a light source including the first and second lights.

The photographing method may further include interpolating a pixel included in the determined regular reflection area.

According to one or more embodiments, a non-transitory computer-readable storage medium stores a computer program for performing one or more of the methods described herein when executed by a processor. The method may include: capturing an image of a subject by using a first light having a first spectral radiant characteristic to acquire a first captured image; capturing an image of the subject by using a second light having a second spectral radiant characteristic to acquire a second captured image; extracting a first regular reflection candidate area from the first captured image by using a first reference output ratio corresponding to the first light; extracting a second regular reflection candidate area from the second captured image by using a second reference output ratio corresponding to the second light; and determining an area overlapping between the first and second regular reflection candidate areas to be a regular reflection area of a light source that includes the first and second lights.

The photographing method may include interpolating a pixel included in the determined regular reflection area.

DRAWINGS

These and/or other aspects will become apparent and more readily appreciated from the following description of the embodiments taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below by referring to the figures. Expressions such as "at least one of," when preceding a list of elements, modify the entire list of elements.

It will be understood that, although the terms, 'first', 'second', etc. may be used herein to describe various elements, these elements should not be limited by these terms. These terms are only used to distinguish one element from another.

Hereinafter, various embodiments will be described in detail with reference to the attached drawings. Like reference numerals in the drawings denote like elements.

Figure 1:
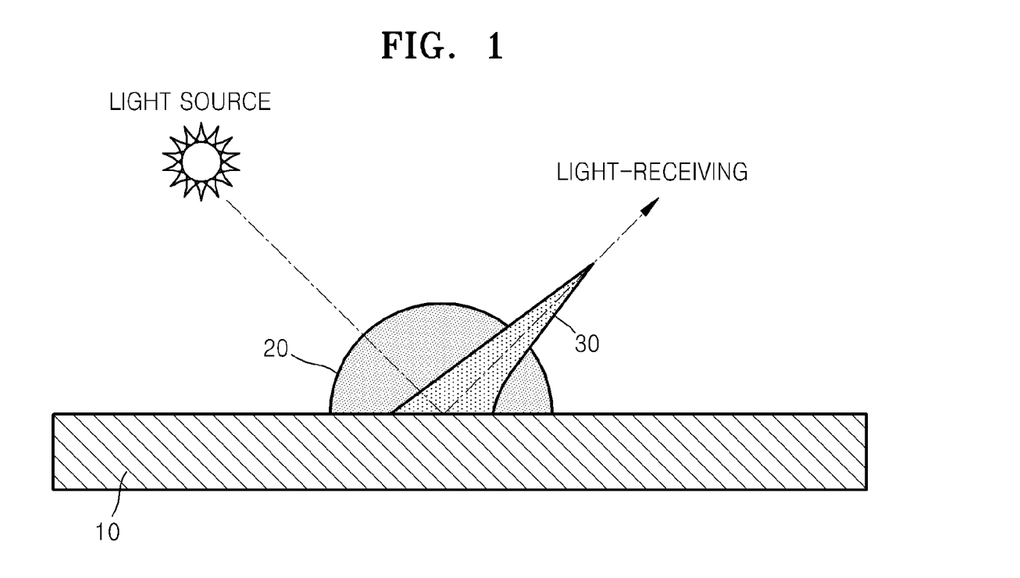
FIG. 1 illustrates a reflection characteristic of a general material.

FIG. 1 is a view illustrating a reflection characteristic of a general material 10.

The material 10 has a spectral radiant characteristic indicating which wavelengths of light it diffuses and which wavelengths of light it reflects.

As shown in FIG. 1, if ambient light such as sunlight or the like is incident on the material 10 (such as a subject), some of the light may be diffused and some light may be reflected by the material 10. Also, the reflected light has a reflection spectrum that is impacted by the spectrum of the ambient light based on its spectral radiant characteristics 20. If the reflection is a regular reflection, then spectrum of the light emitted from the light source and the spectrum of the reflected light 30 will be consistent.

Figure 2:
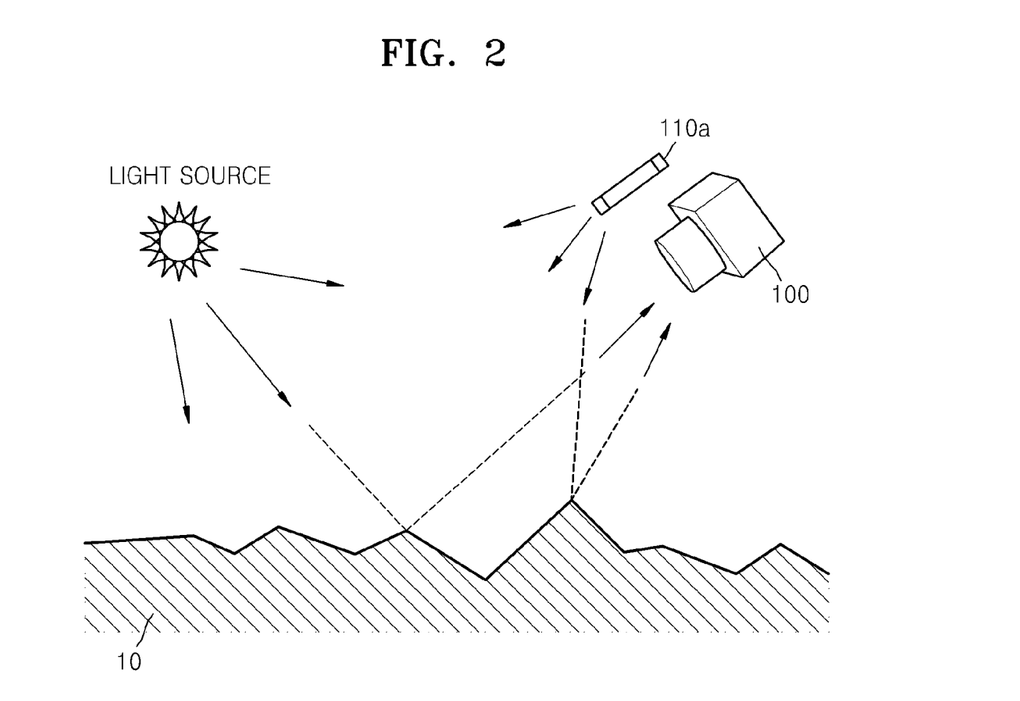
FIG. 2 illustrates an effect of a regular reflection produced by light in a general photographing apparatus.

FIG. 2 illustrates the effect of a regular reflection produced by light in a general photographing apparatus.

As shown in FIG. 2, when an image of a subject is captured by using a photographing apparatus such as a camera or the like, a flash may be used.

The camera (100) captures ambient light reflected from a material 10 such as a subject. Since light from the flash ("flash light") 110a radiates in a different manner from the ambient light, regular reflections of both the ambient light and the flash light may be captured by the camera 100 according to the state of the subject as shown in FIG. 2. If the regular reflection of the flash light is captured, the regular reflection of the flash light overlaps with the reflected ambient light, thereby removing information about the ambient light in those regions in which the flash light is regularly reflected. As a result, when an image of a subject is captured, e.g., behind glass, a part corresponding to the regular reflection of the flash light is whitened, i.e., a unnatural image is generated.

Also, flash photography is generally performed when the ambient light is low. In this situation, the position of the regular reflection of the ambient light may be unclear. The regular reflection of the flash light may not be captured, and thus an unnatural image may be generated.

If the unnatural image is generated by the regular reflection of the flash light, the regular reflection area of the flash light in the captured image may be corrected, thereby removing information about the regular reflection of the flash light. Because of this, it may not be possible to accurately determine which part of the captured image is the regular reflection area.

Figure 3:
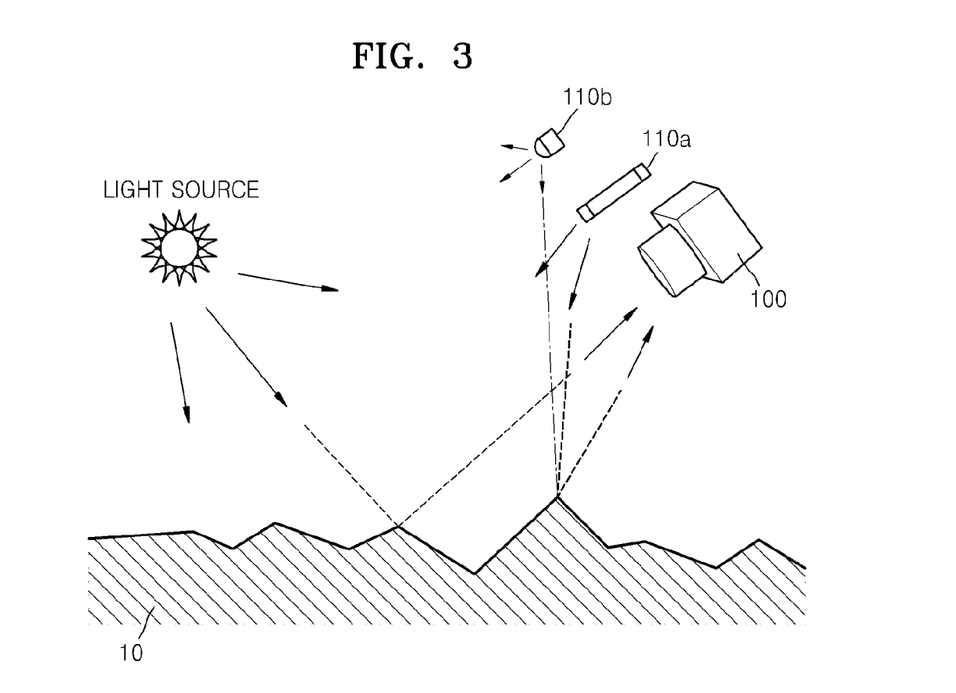
FIG. 3 illustrates effects of regular reflections produced by a plurality of lights in a photographing apparatus according to an embodiment.

FIG. 3 is a view illustrating effects of regular reflections produced by a plurality of lights in a photographing apparatus according to an embodiment.

The photographing apparatus 100 according to an embodiment may use a plurality of light sources that actively radiate a plurality of lights (e.g., a first light, second light, etc.) having different spectral radiant characteristics.

The "spectral radiant characteristic" or "spectral radiant characteristics" of a light indicate the characteristics of the light as radiated by a material or light source, such as the light's wavelengths, brightness (illumination intensity), or the like.

As shown in FIG. 3, the photographing apparatus 100 may use a first light 110a having a first spectral radiant characteristic and a second light 110b having a second spectral radiant characteristic.

For example, the photographing apparatus may capture a subject by using the first light 110a having the first spectral radiant characteristic to acquire a first captured image and capture the subject by using the second light 110b having the second spectral radiant characteristic to acquire a second captured image. In this case, the first captured image may include reflected light of the ambient light and a regular reflection area of the first light. Also, the second captured image may include the reflected light of the ambient light and a regular reflection area of the second light.

Also, when the photographing apparatus captures the subject, an output ratio between pixels output from the photographing apparatus may be stored as a reference output ratio. For example, the reference output ratio may be an output ratio between R, G, and B pixels output from an imaging device having a Bayer array.

According to an embodiment, a first reference output ratio corresponding to the first light and a second reference output ratio corresponding to the second light may be pre-stored in a storage unit. In this case, the first reference output ratio may be an output ratio between pixels output from the imaging device when capturing by using the first light, and the second reference output ratio may be an output ratio between pixels output from the imaging device when performing capturing by using the second light.

Figure 4:
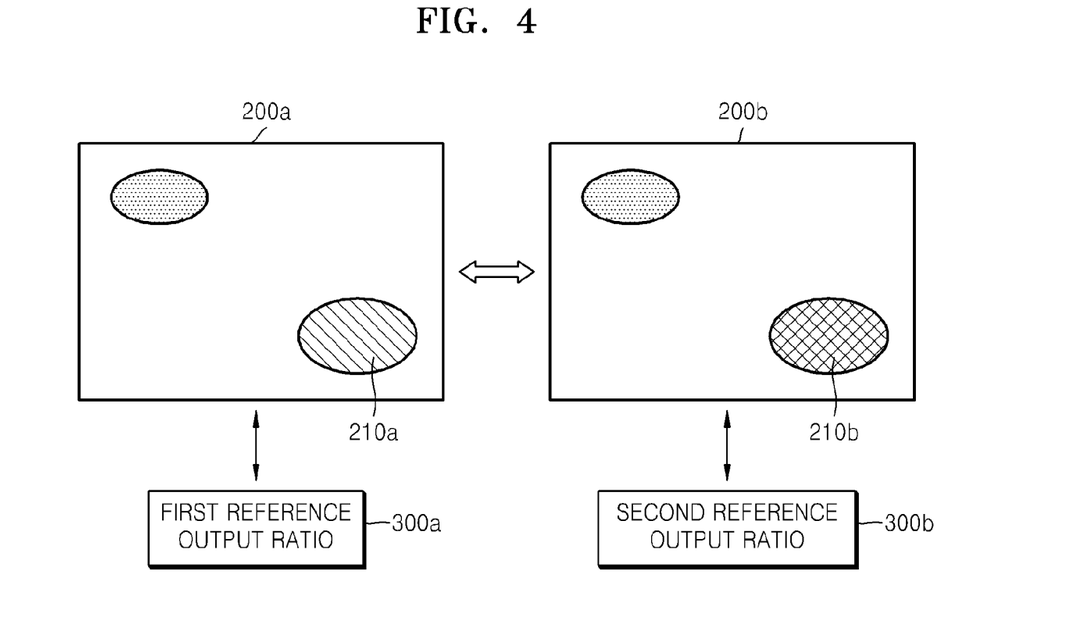
FIG. 4 illustrates a method of determining regular reflection areas of a plurality of lights in a photographing apparatus, according to an embodiment.

FIG. 4 is a view illustrating a method of determining regular areas of a plurality of lights in a photographing apparatus, according to an embodiment.

As shown in FIG. 4, a first regular reflection candidate area 210a may be extracted from a first captured image 200a that is acquired using a first light to capture an image of a subject, by using a first reference output ratio 300a. Also, a second regular reflection candidate area 210b may be extracted from a second captured image 200b that is acquired using a second light to capture an image of a subject, by using a second reference output ratio 300b. In this case, an area overlapping between the first and second regular reflection candidate areas may be a regular reflection area of the plurality of light sources.

The first and second lights according to an embodiment may have different spectral radiant characteristics.

Wavelengths may be included as spectral radiant characteristics according to an embodiment. For example, if general flash light is used as the first light, the first light may be white light using a xenon (Xe) light source.

In this case, the second light may be from a light source having a wavelength other than the main emission wavelength of the Xe light source. For example, the light source may be a flash light pre-installed in the photographing apparatus such as a light source pre-installed in the photographing apparatus for autofocus (AF), a light source pre-installed for correcting a red eye, or the like. Two installed light-emitting diodes (LEDs) may be also be used as light sources.

Figure 5:
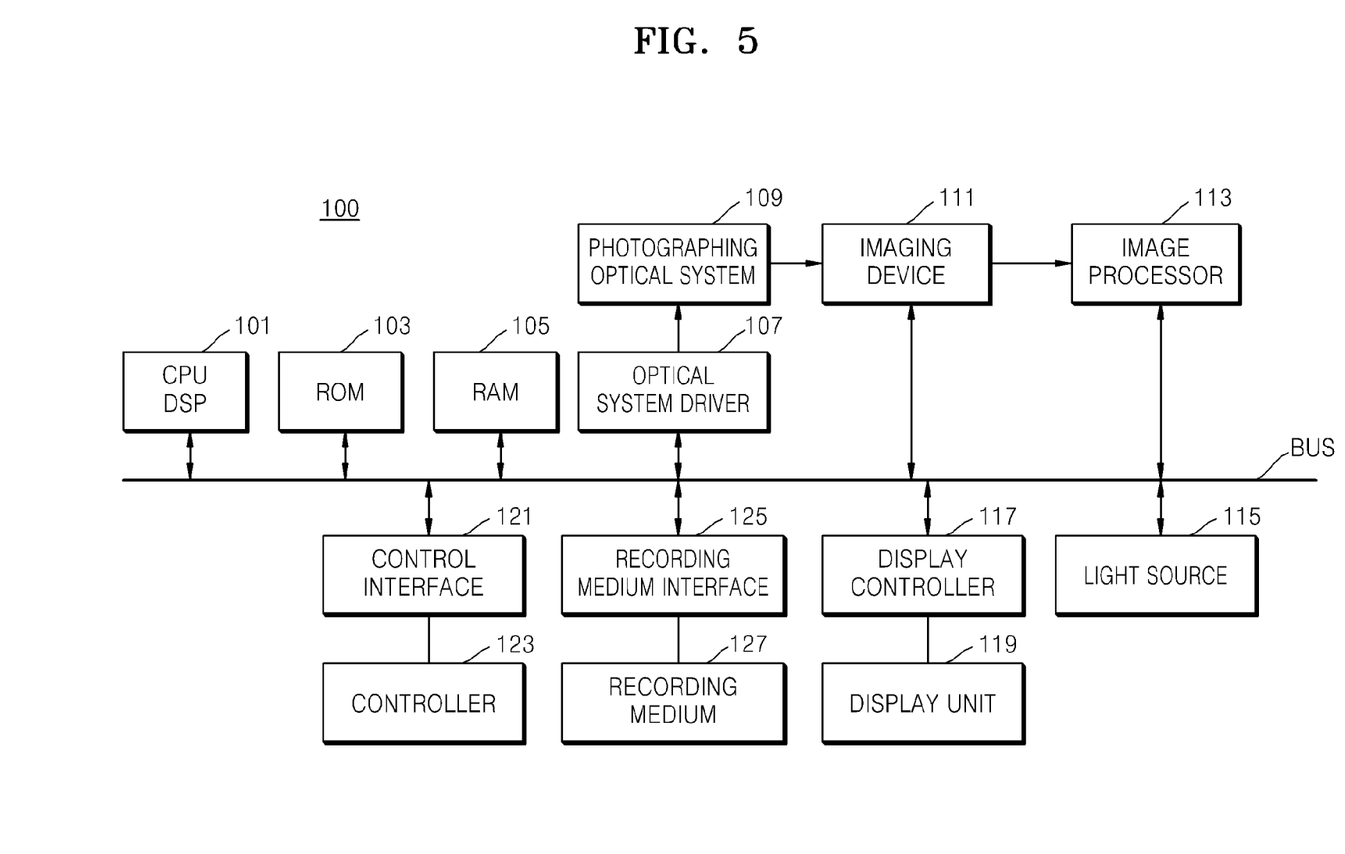
FIG. 5 is a block diagram of a photographing apparatus according to an embodiment.

FIG. 5 is a block diagram of a photographing apparatus 100 according to an embodiment.

Referring to FIG. 5, the photographing apparatus 100 includes a central processing unit (CPU) 101 (which may be implemented as a digital signal processor or DSP), a read only memory (ROM) 103, a random access memory (RAM) 105, an optical system driver 107, a photographing optical system 109, an imaging device 111, an image processor 113, a light source 115, a display controller 117, a display unit 119, a control interface 121, a controller 123, a recording medium interface 125, and a recording medium 127.

The elements of the photographing apparatus 100 of FIG. 5 will now be described in order.

Examples of the photographing apparatus 100 may include all types of apparatuses that capture a subject by using light, such as a digital camera, a portable phone, a smartphone, a laptop computer, a table PC, an electronic book terminal, a digital broadcasting terminal, a personal digital assistant (PDA), a portable multimedia player (PMP), etc.

The CPU 101 operates as an operation processing unit and a control unit and controls an overall operation of the photographing apparatus 100 or a part of the overall operation according to various types of programs recorded on the ROM 103 or the RAM 105. The ROM 103 stores a program, an operation parameter, etc. used by the CPU 101. The RAM 105 primarily stores the program used by the CPU 101, a parameter appropriately varying with an execution of the program, etc. The CPU 101, the ROM 103, and the RAM 105 are connected to one another by a bus comprising an internal bus such as a CPU bus or the like.

As the CPU 101, the ROM 103, and the RAM 105 are connected to one another, an AF unit that controls AF of the photographing apparatus 100, an auto exposure (AE) unit that controls AE, an auto white balance (AWB) unit that controls white balance, or the like may be used.

The photographing optical system 109 guides light from a subject onto a light-receiving surface of the imaging device 100 (described later) under control of the optical system driver 107 (described later). Therefore, the light incident onto the light-receiving surface of the imaging device 111 is converted into an electric signal by the imaging device 111 to generate a captured image. For example, the photographing optical system 109 may include a lens group including a lens (e.g., zoom lens, focus lens, etc.), an aperture, a shutter, and a filter (e.g., neutral density (ND) filter, etc.)

Light (including ambient light, flash light, or the like) guided by the photographing optical system 109 is incident onto the light-receiving surface of the imaging device 111 that is installed in the rear of the photographing optical system 109. The light receiving surface of the imaging device 111 is configured such that light-receiving units are arrayed in a 2-dimensional (2D) form. The light-receiving units convert the light incident onto the light-receiving surface into an electric signal corresponding to an amount of the light. The electric signal is read in each pixel, which includes one or more light-receiving devices in order, and thus an image corresponding to the incident light is generated. The timing for resetting a pixel signal by the imaging device 111 or the timing for reading the pixel signal by the imaging device 111 is controlled by the optical system driver 107 (described later). The imaging device 111 may be, for example, a complementary metal oxide semiconductor (CMOS) sensor, a charge-coupled device (CCD) sensor, etc. The electric signal (i.e., the captured image) generated by the imaging device 111 is output to the image processor 113 (described later).

The optical system driver 107 is a processor that controls the driving of the lens group, the aperture, the shutter, the ND filter, etc. of the photographing optical system 109 or the imaging device 111. The optical system driver 107 controls the focus position of the lens group, opened and closed degrees of the aperture, timing for opening and the closing the shutter, the reading timing of the imaging device 111, or the like, to generate a captured image of the subject. The detailed structure of the optical system driver 107 is not limited, and all well-known technologies may be used.

The image processor 113 performs various types of image processing, including well-known pre-processing and post-processing, on the captured image generated by the imaging device 111. The image processor 113 may perform compression processing for compressing the captured image. The image processor 113 defines a regular reflection area of the actively transmitted light as described above and interpolates the regular reflection area. A detailed structure of the image processor 113 will be described in detail later.

The light source 115 actively transmits light when an image of the subject is being captured. A plurality of light sources having different spectral optical characteristics are installed in the photographing apparatus 100 of an embodiment and used for defining the regular reflection position. An Xe light source used as flash light, a light source pre-installed in an imaging device to be used for AF, a light source pre-installed to correct red eye, or the like may be used as the light source 115. One LED or a plurality of LEDs may be installed to define the regular reflection position.

Also, a transmission angle of the light source 115 used to define the regular reflection position may be the same. Alternatively, the transmission angle may not be completely the same, or transmission angles of a plurality of light sources may have preset differences that may be neglected with respect to a captured image according to the viewing angle of the captured image or a distance between the photographing apparatus 100 and the subject.

The display controller 117 controls a display of the display unit 119. The display unit 119 (described later) may be implemented as a liquid crystal display (LCD), an electronic view finder (EVF), or the like. The captured image, a menu screen for selecting various functions of the photographing apparatus 100, or the like may be displayed on a display screen of the display unit 119.

In an embodiment, the LCD or the EVF operates as the display unit 119, and display of the contents of the LCD or the EVF is controlled by the display controller 117. A user of the photographing apparatus 100 may see contents displayed on display screens of these display units, which allows the user to check the captured image or select various menus.

The control interface 121 is an interface through which information (control information) about various types of controls usable by the user as passed through the controller 123. Such controls may include, for example, hard keys, a dial, or the like of the photographing apparatus 100. Various types of control information input through the control interface 121 are provided to the CPU 101 to carry out various functions corresponding to the control information. The structure of the controller 123 is not limited, and a well-known input unit such as a a touch panel or the like may be used.

The recording medium interface 125 is an interface through which the recording medium 127 is connected to the photographing apparatus 100 and operates as a driver that drives the recording medium 127. The recording medium 127 is an example of an external memory unit installed in the photographing apparatus 100. The recording medium interface 125 may write various types of data to the recording medium 127 or read various types of data from the recording medium 127. The recording medium interface 125 may be connected to the display controller 117 to display various types of data recorded on the recording medium 125 on the display unit 119. Possible implementations of the recording medium 127 include various types of well-known recording media. The recording medium interface 125 may be appropriately selected according to the type of the recording medium 127.

A storage unit 120 according to an embodiment may store a first reference output ratio corresponding to a first light and a second reference output ratio corresponding to a second light. For example, the storage unit may be the ROM 103, the RAM 105, or the recording medium 127.

Figure 6:
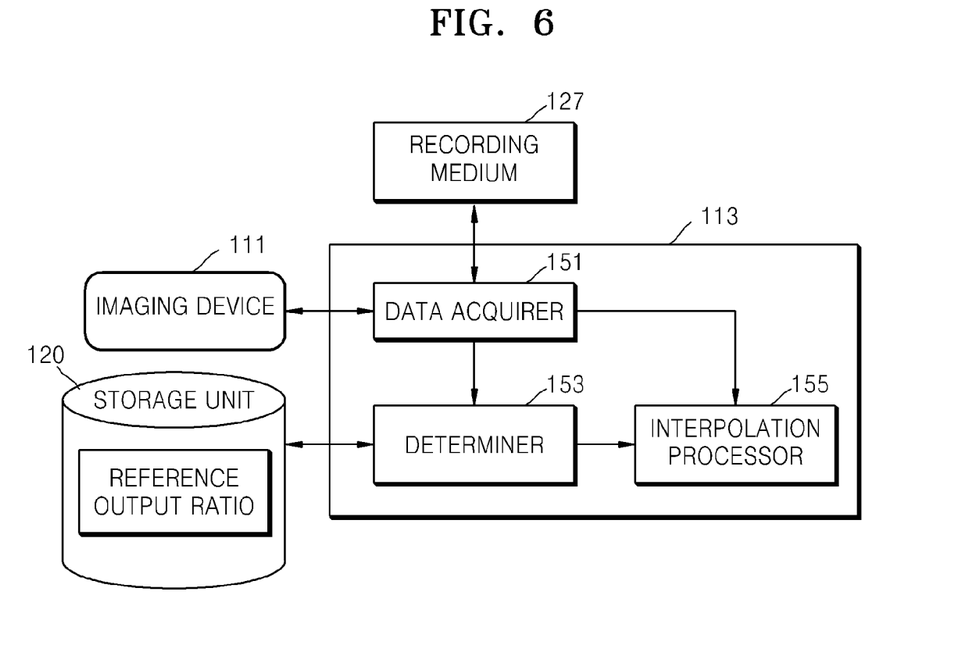
FIG. 6 is a block diagram of an image processor of a photographing apparatus, according to an embodiment.

FIG. 6 is a block diagram of an image processor 113 of a photographing apparatus 100, according to an embodiment.

Referring to FIG. 6, the image processor 113 includes a processor (not shown in FIG. 6) that performs well-known pre-processing and post-processing or image compression processing, a data acquirer 151, a determiner 153, and an interpolation processor 155.

The data acquirer 151 acquires real data of an image captured by the imaging device 111. The real data may be acquired directly from the imaging device 111 or from the recording medium 127. The data acquirer 151 outputs the acquired real data of the captured image to the determiner 153 and the interpolation processor 155 (described later).

The determiner 153 defines the regular reflection area with respect to the real data of the captured image output from the data acquirer 151 by using first and reference output ratios stored in a storage unit 120 that may be the ROM 103, the RAM 105, or the recording medium 127.

Hereinafter, the regular reflection position will be defined by using a first light having a first spectral radiant characteristic and a second light having a second spectral radiant characteristic.

For example, if a first captured image is acquired by capturing an image of a subject by using the first light, and a second captured image is acquired by capturing an image of the subject by using the second light, the determiner 153 may respectively acquire first and second reference output ratios respectively corresponding to the first and second lights. The determiner 153 compares the value of a pixel of the first captured image with the first reference output ratio corresponding to the first light to define a part of the captured image in which an output ratio calculated from the pixel value of the first captured image becomes equal or approximately equal to the first reference output ratio.

If such a pixel exists, the determiner 153 stores coordinates of the pixel (for example, its position in a captured image). A group of such pixels is a first regular reflection candidate area.

The determiner 153 extracts a second regular reflection candidate area from the second captured image by using the above-described method.

The determiner 153 determines whether coordinates of the first regular reflection candidate area extracted from the first captured image overlap with coordinates of the second regular reflection candidate area extracted from the second captured image.

If an area overlapping between the first and second regular reflection candidate areas exists, the determiner 153 may determine the overlapping area as a regular reflection area of a plurality of light sources.

This is because, even if a spectral radial characteristic (for example, a wavelength) of light is different, the position of a regular reflection area of the light is not changed.

If positions of regular reflection areas of a plurality of light sources are defined, the determiner 153 outputs information (regular area position information) indicating the positions of the regular reflection areas to the interpolation processor 155.

The interpolation processor 155 performs interpolation processing with respect to a pixel included in a defined regular reflection area with reference to the regular reflection area position information output from the determiner 153. Therefore, the interpolation processor 155 may perform interpolation processing with a part of a captured image derived from a regular reflection of light.

For example, the interpolation processor 155 may interpolate a neighboring pixel of a regular reflection area of a captured image, an image acquired before and after performing capturing by using the light (i.e., a captured frame captured before and after a captured image including a regular reflection area), or a pixel included in the regular reflection area according to a degree of an intensity modulation of the light (according to a relation when modulating an intensity of the light).

The interpolation processor 155 may perform interpolation of a regular reflection area in a variety of ways, and other types of well-known interpolation processing may be applied.

If the regular reflection area has a size (an area) larger than or equal to a preset threshold value, the interpolation processor 155 may output information usable to select which interpolation method is used for a pixel included in the regular reflection area. Therefore, the user may select the interpolation method used for an interpolation of a regular reflection area from a plurality of interpolation methods as described above.

Also, if the size (area) of the regular reflection area is larger than or equal to the preset threshold value, the interpolation processor 155 may output information for informing the user of an error in capturing the image. In this way, the user may be alerted that the image has not be properly captured.

The above-described method of defining a regular reflection area on an object to be photographed may be applied when a photographer intentionally uses a flash or any other light transmission source.

For example, an image may be captured in a low light environment. Currently existing photographing devices use a flash having only one type of light, which has a one type of spectral radiant characteristic. Therefore, if the ambient light is low, a determination may be made as to whether a regular reflection area is generated by flash light or is appropriate based on the ambient light in an image captured by flash. However, the method of defining the regular reflection area according to an embodiment may be used to correctly determine a regular reflection area derived from actively-transmitted light such as flash light or the like, even in a low light environment.

Also, a photographing method of defining a regular reflection area according to an embodiment may be applied to image capturing that is performed using a light source having the same spectral radiant characteristic as sunlight or a flash component. If a spectral radiant characteristic of a flash light source is equal to a spectral radiant characteristic of the ambient light, a regular reflection area produced by the ambient light may be correctly captured. With a single flash light sourcet, a regular reflection area may be defined according to whether the flash light exits. However, image capturing may be performed by using a plurality of light sources having different spectral radiant characteristics to define a regular reflection area with a higher degree of precision.

In the above description, image capturing is performed by using flash light. However, the method of defining the regular reflection area according to an embodiment may be effective in the above-described cases even with other light sources that would be used by a photographer.

FIGS. 7A through 7D illustrate a plurality of lights installed in a photographing apparatus, according to various embodiments.

As shown in FIGS. 7A through 7D, two light sources 115a and 115b may be installed in various forms in the photographing apparatus 100. At least one of a plurality of light sources may be removably installed in the photographing apparatus 100.

Figure 7A:
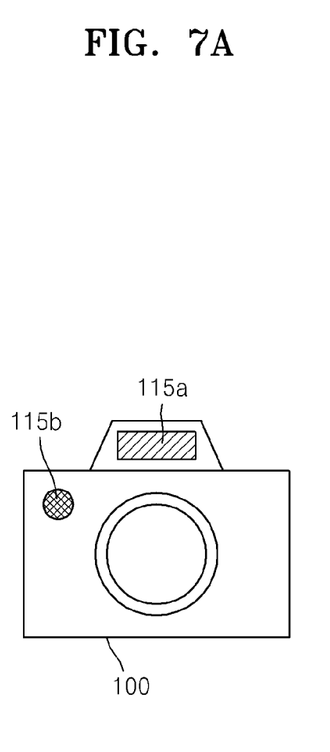
FIGS. 7A through 7D illustrate a plurality of lights installed in a photographing apparatus, according to various embodiments.
Figure 7B:
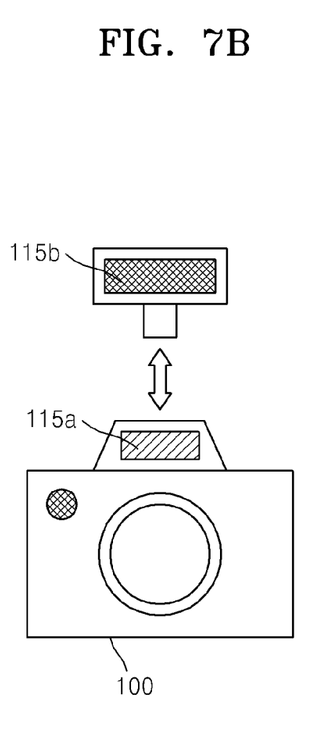
Figure 7C:
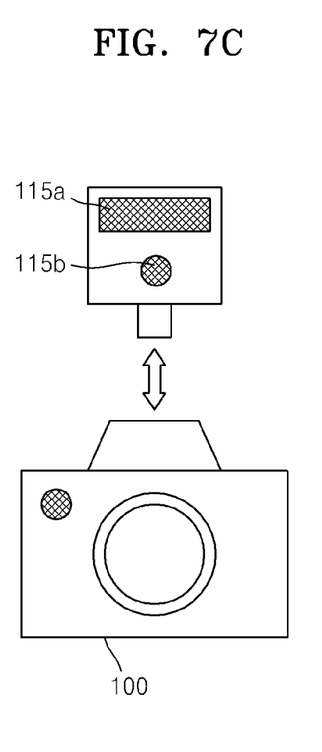
Figure 7D:
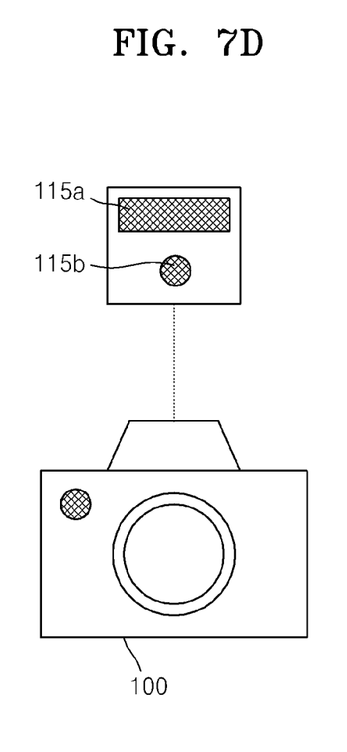

As shown in FIG. 7A, both of the two light sources 115a and 115b may be installed in a main body of the photographing apparatus 100. As shown in FIG. 7B, one (the light source 115b in FIG. 7) of the two light sources 115a and 115b may be installed in an external unit that is removably installed in the photographing apparatus 100. As shown in FIG. 7C, both of the two light sources 115a and 115b may be installed in the external unit. As shown in FIG. 7D, the two light sources 115a and 115b may be installed in the external unit, which operates with the main body of the photographing apparatus 100.

This structure enables multiple configurations for a plurality of light sources with respect to the photographing apparatus 100.

Operations of the photographing apparatus 100 will now be described in order.

Figure 8:
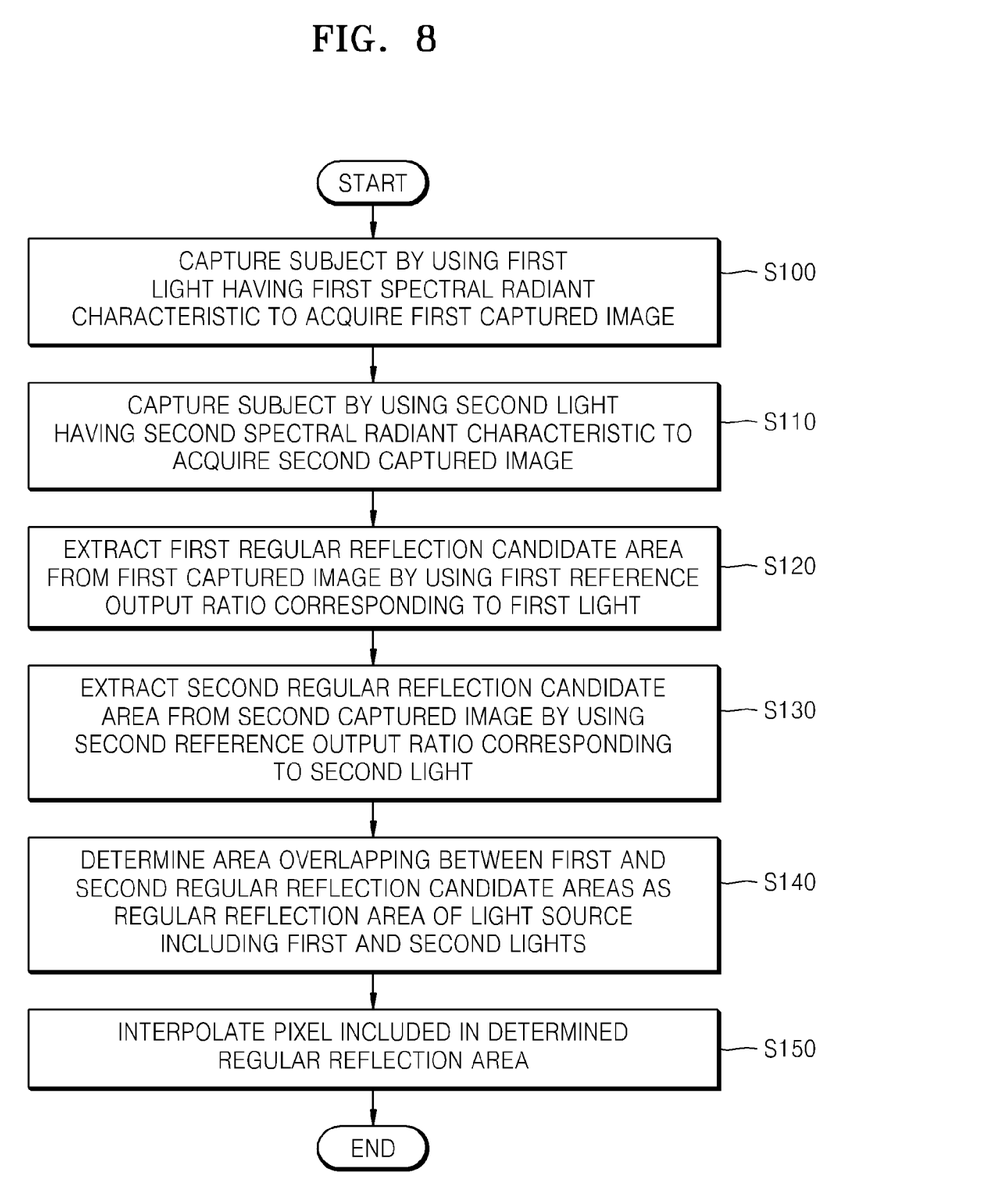
FIG. 8 is a flowchart of a photographing method according to an embodiment.

FIG. 8 is a flowchart of a photographing method according to an embodiment.

Referring to FIG. 8, in operation S100, the photographing apparatus 100 captures an image of a subject by using a first light having a first spectral radiant characteristic to acquire a first captured image.

In operation S110, the photographing apparatus 100 captures the subject by using a second light having a second spectral radiant characteristic to acquire a second captured image.

In this case, the acquired first captured image may be stored in the RAM 105, the recording medium 127, or the like.

In operation S120, the photographing apparatus 100 extracts a first regular reflection candidate area from the first captured image by using a first reference output ratio corresponding to the first light.

In this case, the acquired first captured image may be stored in the RAM 105, the recording medium 127, or the like.

In operation S130, the photographing apparatus 100 extracts a second regular reflection candidate area from the second captured image by using a second reference output ratio corresponding to the second light.

In operation S140, the photographing apparatus 100 determines an area overlapping between the first regular reflection candidate area extracted in operation S120 and the second regular reflection candidate area extracted in operation S130 as a regular reflection area of a light source that includes the first and second lights.

In operation S150, the photographing apparatus 100 interpolates a pixel included in the regular reflection area determined in operation S140.

In the above description, both of first and second captured images are acquired, and then a regular reflection candidate area is extracted. However, each of the first and second captured images may be before the regular reflection candidate area is extracted.

An apparatus according to various embodiments may include a processor, a memory that stores and executes program data, a permanent storage such as a disk drive, a communication port that communicates with an external apparatus, a user interface such as a touch panel, a key, a button, or the like, etc All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the embodiments.

The embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Operations of methods described herein may be performed in any appropriate order. The scope of this disclosure is not limited by the following claims, it is not limited by the examples or the exemplary terms. It will be understood by those of ordinary skill in the art that various modifications, combinations, and changes in form and details may be made according to design conditions and factors therein without departing from the spirit and scope as defined by the following claims or equivalents thereof.

What is claimed is:

1. A photographing apparatus comprising:
   a plurality of light sources that respectively transmit a first light having a first spectral radiant characteristic and a second light having a second spectral radiant characteristic;
   an image device that captures an image of a subject by using the first and second lights;
   a storage unit that stores a first reference output ratio corresponding to the first light and a second reference output ratio corresponding to the second light; and
   a determiner that determines a regular reflection area of the plurality of light sources by using a first captured image acquired by capturing an image of the subject by using the first light, a second captured image acquired by capturing an image of the subject by using the second light, the first reference output ratio, and the second reference output ratio,
   extracts a first regular reflection candidate area from the first captured image by using the first reference output ratio,
   extracts a second regular reflection candidate area from the second captured image by using the second reference output ratio, and
   determines an area overlapping between the first and second regular reflection candidate areas as the regular reflection area of the plurality of light sources; wherein the first reference output ratio is an output ratio between pixels output from the imaging device when capturing an image of the subject by using the first light, and the second reference output ratio is an output ratio between pixels output from the imaging device when capturing an image of the subject by using the second light.

2. The photographing apparatus of claim 1, wherein an incidence angle of the first light is equal to an incidence angle of the second light.

3. The photographing apparatus of claim 1, further comprising:
   an interpolation processor that interpolates a pixel included in the regular reflection area.

4. The photographing apparatus of claim 3, wherein the interpolation processor interpolates the pixel included in the regular reflection area based on a neighboring pixel of the regular reflection area, a captured image captured before and after a capturing image comprising the regular reflection area, or a degree of an intensity modulation of the plurality of light sources.

5. The photographing apparatus of claim 3, wherein if the regular reflection area is an area having a size larger than or equal to a preset threshold value, the interpolation processor outputs information for selecting an interpolation method for the pixel included in the regular reflection area.

6. The photographing apparatus of claim 3, wherein if the regular reflection area is the area having the size larger than or equal to the preset threshold value, the interpolation processor outputs information for notifying a capturing error to a user.

7. The photographing apparatus of claim 1, wherein at least one of the plurality of light sources is removably installed in the photographing apparatus.

8. A photographing method comprising:

capturing an image of a subject by using a first light having a first spectral radiant characteristic to acquire a first captured image;

capturing an image of the subject by using a second light having a second spectral radiant characteristic to acquire a second captured image;

extracting a first regular reflection candidate area from the first captured image by using a first reference output ratio corresponding to the first light;

extracting a second regular reflection candidate area from the second captured image by using a second reference output ratio corresponding to the second light; and determining an area overlapping between the first and second regular reflection candidate areas as a regular reflection area of a light source comprising the first and second lights, wherein the first reference output ratio is an output ratio between pixels output from the imaging device when capturing an image of the subject by using the first light, and the second reference output ratio is an output ratio between pixels output from the imaging device when capturing an image of the subject by using the second light.

9. The photographing method of claim 8, further comprising:

interpolating a pixel included in the determined regular reflection area.

10. A non-transitory computer-readable storage medium storing computer-readable instructions for performing a photographing method executed by a processor, wherein the photographing method comprises:

capturing an image of a subject by using a first light having a first spectral radiant characteristic to acquire a first captured image;

capturing an image of the subject by using a second light having a second spectral radiant characteristic to acquire a second captured image;

extracting a first regular reflection candidate area from the first captured image by using a first reference output ratio corresponding to the first light;

extracting a second regular reflection candidate area from the second captured image by using a second reference output ratio corresponding to the second light; and determining an area overlapping between the first and second regular reflection candidate areas as a regular reflection area of a light source comprising the first and second lights, wherein the first reference output ratio is an output ratio between pixels output from the imaging device when capturing an image of the subject by using the first light, and the second reference output ratio is an output ratio between pixels output from the imaging device when capturing an image of the subject by using the second light.

11. The non-transitory computer-readable storage medium of claim 10, wherein the photographing method comprises interpolating a pixel included in the determined regular reflection area.

* * * * *